(12) United States Patent
Melchior

(10) Patent No.: US 7,011,056 B2
(45) Date of Patent: Mar. 14, 2006

(54) VARIABLE TIMING DEVICE FOR RECIPROCATING ENGINES, ENGINES COMPRISING SAME AND DISTRIBUTION AND TURBOCHARGING METHOD

(76) Inventor: Jean Frédéric Melchior, 16 rue de l'Abbaye, 75006 Paris (FR)

( * ) Notice: Subject to any disclaimer, the term of this patent is extended or adjusted under 35 U.S.C. 154(b) by 0 days.

(21) Appl. No.: 10/450,513

(22) PCT Filed: Dec. 14, 2001

(86) PCT No.: PCT/FR01/04006

§ 371 (c)(1),
(2), (4) Date: Dec. 1, 2003

(87) PCT Pub. No.: WO02/48510

PCT Pub. Date: Jun. 20, 2002

(65) Prior Publication Data

US 2004/0069256 A1   Apr. 15, 2004

Related U.S. Application Data

(60) Provisional application No. 60/272,060, filed on Mar. 1, 2001.

(30) Foreign Application Priority Data

Dec. 15, 2000  (FR) .................................. 00 16422

(51) Int. Cl.
*F01L 1/34*  (2006.01)

(52) U.S. Cl. ............................... 123/90.16; 123/90.15; 123/90.6

(58) Field of Classification Search .. 123/90.15–90.18, 123/90.27, 90.6; 74/53, 54, 55, 567
See application file for complete search history.

(56) References Cited

U.S. PATENT DOCUMENTS

| | | | | |
|---|---|---|---|---|
| 4,741,301 A | * | 5/1988 | Patterson | 123/90.22 |
| 5,918,577 A | * | 7/1999 | Martelli et al. | 123/295 |
| 5,934,263 A | * | 8/1999 | Russ et al. | 123/698 |

* cited by examiner

*Primary Examiner*—Thomas Denion
*Assistant Examiner*—Zelalem Eshete
(74) *Attorney, Agent, or Firm*—Stites & Harbison; Douglas E. Jackson

(57) ABSTRACT

The invention concerns a variable timing device for reciprocating engines with, at least two cam shafts (AC1, AC2) comprising, at least an intake valve (A) and at least an exhaust valve (E) actuated by said shafts, and means for shaft angular offset D1, D2). The invention is characterised in that at least a common valve (A) is actuated by hydraulic transmission means (4, 9, 10) adapted to transmit to said valve the movement of at least two cams (A1, A2) belonging to the shafts with distinct cams (AC1, AC2) capable of being offset relative to each other. The invention also concerns engines comprising said timing system and a timing and turbocharging method capable of using said distribution.

15 Claims, 9 Drawing Sheets

SINGLE-STAGE TURBOCHARGING WITH
TURBINE OF VARIABLE GEOMETRY

TWO-STAGE TURBOCHARGING WITH FIXED
GEOMETRY

VARIABLE TIMING DEVICE FOR RECIPROCATING ENGINES, ENGINES COMPRISING SAME AND DISTRIBUTION AND TURBOCHARGING METHOD

This application claims the benefit of Provisional Application No. 60/272,060, filed Mar. 1, 2001.

The present invention relates to a variable timing device for reciprocating engines having at least two camshafts, at least one of which is equipped with an angular phase shifter, and especially having two overhead camshafts, as well as to variable timing methods which can be used in such engines. Timing is to be understood as meaning, in the conventional manner, the totality of the admission and exhaust sequences for the cylinder(s) of the reciprocating engine.

It is known that the performance of reciprocating engines is highly dependent on the angular positions of the crankshaft, at which the valves open and close in the engine cycle, and that the optimum timing diagram changes with the operating conditions and, especially, with the speed and the load. That timing affects the effective compression and expansion ratios, the quantity of burnt gases optionally recycled, the energy available in the exhaust gases, the volumetric efficiency, the engine brake, etc. It is therefore desirable to be able to modify, during operation of the engine, the adjustment of the opening and closing angles of the cavity of the cylinder.

In engines in which the valves are actuated, in the conventional manner, by camshafts, it is possible to equip the latter with means of angular phase shifting relative to the crankshaft, which means allow the opening and closing angles of the actuated valve to be offset simultaneously, the angular duration of opening, on the other hand, remaining constant.

Consideration has also already been given to regulating the start and the end of the admission and exhaust phases independently and, consequently, varying the angular duration of opening of the valves. To that end, it has already been proposed to operate the valves using electro-hydraulic means, allowing freedom from the fixed geometry of camshaft cams. However, such operating devices are complex and costly and do not permit recovery of the totality of the energy used for opening the valves, which energy is dissipated as heat in the operating fluid and increases the fuel consumption.

U.S. Pat. No. 4,974,560 describes a variable timing device for reciprocating engines having two camshafts, in which each cylinder comprises two admission valves and two exhaust valves, one of the valves of a pair of admission valves and/or of a pair of exhaust valves being actuated by a first camshaft and the second by a second camshaft, means of angular phase shift relative to the crankshaft allowing one of the camshafts to be offset relative to the other and, accordingly, allowing the operating phases of one valve of one of the pairs to be offset relative to the other valve of the pair. This device, by means of which it is possible to remedy the disadvantages of an earlier proposal consisting in actuating a single valve by two cam profiles capable of being phase-shifted relative to one another, makes it possible to vary the angular positions of opening or closing of the valves as well as their duration of opening, in order better to adapt them to the operating conditions of the engine, for example an increase in the angular durations of admission and exhaust when the speed of the engine is high, or alternatively, if the engine is at high speed but under a low load, a reduction in those angular durations.

U.S. Pat. No. 5,003,939 describes a mechanism in which the valve lift height can be increased during an increase in the duration of an opening phase, but at the expense of extreme mechanical complexity.

Application WO 01/42627 describes a similar device for a four-stroke engine having at least two admission valves, the angular phase shift of the two camshafts being regulated to vary the quantity of air of a spark ignition engine without undergoing losses of energy from the regulation of the flow in the intake manifold.

Japanese application JP-A-06248916 describes a similar device in which the two camshafts are equipped with phase shifters.

The disadvantage of all those devices is that they are not applicable to engines equipped with a single admission and/or exhaust valve by cylinder.

Moreover, the non-simultaneity of the opening or closing of the admission valves or of the exhaust valves can have undesirable effects on the internal aerodynamics of the cylinders.

The present invention proposes to remedy the various disadvantages of the prior art and to provide an extremely simple solution for an engine equipped with any number of admission and/or exhaust valves, making it possible to vary, in a flexible manner, not only the times at which the valves of the cylinder head are opened and closed, but also the angular durations for which the cavity of the cylinder is in communication with the admission or exhaust circuits.

Another objective is to provide a solution which allows the degree of lift of an admission or exhaust valve to be varied, that is to say the distance which separates it from its seat when it is open.

Yet another objective is to provide a device which automatically eliminates the operating play of the valves, which generates noise and wear.

The invention relates to a variable timing device for reciprocating engines having at least two camshafts, comprising, for one and the same cylinder, at least one admission-valve and at least one exhaust valve, which valves are actuated by said shafts, as well as angular phase shift means for at least one of said camshafts, characterised in that at least one and the same valve is actuated by a hydraulic transmission means which is capable of transmitting to said valve the movement of at least two cams belonging to separate camshafts which may be phase-shifted relative to one another. The hydraulic operating means comprises a constant volume of hydraulic fluid which is capable of being displaced by the movements of each of the cams, belonging to the two camshafts, in order to actuate said valve.

To that end the device may advantageously comprise, for each cam, a deformable or movable surface, for example pusher pistons which are capable of being actuated by the cams, as well as a deformable or movable valve surface such as, for example, a piston carried by the valve, so that, by virtue of the incompressibility of the hydraulic liquid, any displacement caused by a cam leads to displacement of the valve. The deformable surfaces, such as pushers or pistons, are advantageously pushed back into the rest position by resilient return means.

In that manner, owing to the incompressibility of the hydraulic fluid, it is possible to obtain a biunique relationship between the positive or negative displacements generated by the cams and the displacement of the valve. Any phase shift between the camshafts modifies the degree of displacement of the valve as a function of the angular position of the crankshaft.

The invention may be used both for two stroke cycle engines and for four stroke cycle engines.

The invention is advantageously applicable to engine cylinders that have only one admission valve and/or only one exhaust valve, to which the prior art does not apply. It is also advantageous for cylinders that are equipped with valves whose displacement axes are oriented in such a manner that mechanical controls are complicated or impossible. Moreover, a pair of phase-shiftable cams may control in parallel any number of valves connected to the same hydraulic circuit. Preference is given to the case in which the valves of one and the same group are identical and in which the degrees of displacement are identical. If the valves of one and the same group are different, their degrees of displacement will vary with the speed of rotation of the engine owing to differences between the inertia and the resistance of the return devices. Operation of the device is stable only if the volume of the hydraulic working fluid has a value which is constant and equal to the volume of the cavity when the cams have their minimum lift (when the pushers are resting on the pitch circle of their cams) and the operated valves are resting on their seats. In fact, if the volume of fluid exceeded that value, conditions would exist in which one valve remains open. On the other hand, if the volume of fluid was below that value, impacts between the valves and their seats would occur, as well as losses of contact between the cams and their pushers. Cavitation phenomena could also occur within the hydraulic fluid.

The preferred solution for adjusting the volume of the working fluid is to calibrate it at each cycle in the following manner:

The cavity is connected to an oil pressure source (for example the lubricating pressure of the engine) by means of a non-return valve for compensating leaks.

A small discharge orifice is open during the rest period, for example by being uncovered by one of the pushers when it is at its dead centre for letting off the overflow. As soon as the pusher begins to move, in order to increase the pressure of the fluid, it closes the orifice and stops the leak. This device ensures automatic elimination of the operating play of the valves.

The angular phase shift means may comprise phase shifters of any type already known for engines having camshafts. However, it is preferred to use the phase shift means described in European Patent 0 388 244 or U.S. Pat. No. 5,645,017, operation of which is especially simple and efficient. The parameters acting on the phase shift means to produce an angular phase shift are, preferably, the load or the engine torque or the speed, that is to say the regime, or a combination of those parameters.

Other parameters, such as the level of recycling of burnt gases, or the operating conditions of turbochargers, the characteristics of the engine brake and the cold start capacities, can be used for acting on the phase shift means.

The invention relates also to engines equipped with the timing according to the present invention.

It relates also to a variable timing method which can be used in the engines of the invention in which, for one and the same cylinder, at least under certain operating conditions, the start of the admission and/or exhaust phases is controlled by means of a cam that belongs to one of the camshafts and the end of said phases is controlled by means of a cam that belongs to another camshaft, by modifying, during operation, the phase shift between said camshafts, and therefore the angular duration of the phase in question, by phase shift means which are sensitive to one or more operating parameters of the engine, the various applications of which method are characterised as follows:

1. In order to optimise the respiration of a 4-stroke engine, the phase shifters are programmed to increase the admission opening advance, the exhaust cut-off retardation, the exhaust opening advance and the admission cutoff retardation when the speed increases.
2. In order to create a retention of hot gases in a 4-stroke engine, especially a diesel engine, the phase shifters are programmed to advance the exhaust cut-off and, correlatively, to retard the admission opening without substantially modifying the exhaust opening and the admission cut-off.
3. In order to accelerate a turbocharger of an engine, the phase shifters are programmed to increase the exhaust opening advance without substantially modifying the exhaust cut-off, and the admission cut-off/opening.
4. In order to compensate for the lack of permeability of a 4-stroke engine equipped with short cams associated with the variable timing systems according to the invention, such an engine is equipped with a two-stage turbocharging system, the high-pressure turbocharger of which is of a size to compress a volume of air equal to the volume scavenged by the pistons at low speed and to expand that volume, supercharged at high speed, through the admission system, which is regulated so that the expanded volume is equal to the value desired at that new speed. In parallel, the excess air may be regulated by the exhaust opening angle in accordance with application
2. This method has the advantage of naturally supplying the engine with a mass of air per cycle which is almost independent of the speed without making use of regulation, and of being able to refine the regulation of the excess combustion air by varying the setting of the timing.

In this manner there is provided a turbocharging method for a 4-stroke engine equipped with two turbochargers, preferably of fixed geometry, which are mounted-in series in the gas circuit, preferably with an air cooler down-stream of each compressor, in which the low-pressure (BP) compressor is of a size to deliver the flow of air necessary for maximum power with an elevated output at the altitude above which decalibration of the engine is accepted. With the present state of technology, that corresponds to a pressure ratio close to 2.5 at sea level.

The high-pressure (HP) compressor is of a size as if the speed of rotation of the engine reached its maximum at the speed of full torque, namely, for example, about 40% of the maximum speed. The volumetric capacity of the HP compressor is consequently, for example, about 40% of that of the low-pressure compressor.

The ratio between the cross-sections of the distributor passages of the BP turbine and of the HP turbine is chosen to limit the pressure ratio of the HP compressor to a value at which the output is optimum and the mechanical load is reasonable. With the present state of technology, that ratio is generally close to 2.

The admission system is configured to create a drop in the static pressure of the air introduced into the cylinder such that, at the admission bottom dead centre, the pressure in the cylinder is substantially the same at the maximum speed and at the speed of maximum torque. In the example described hereinbelow, that drop in pressure is approximately 50% at the maximum speed Nmax and approximately 10% at 0.4 Nmax.

That drop in pressure may advantageously be obtained by an undersized cross-section of the admission orifice(s) of the engine cylinder. It may also be obtained by a shorter duration of the admission phase.

With fixed timing, the admission cut-off is located in the vicinity of the bottom dead centre and the drop in pressure is obtained by accelerating the flow in the admission orifice, which is undersized, of the cylinder.

When the engine is equipped with variable timing, preferably a timing device with hydraulic transmission according to the invention, as described above, the admission cut-off is preferably located in the vicinity of the bottom dead centre at low speed and is advanced when the speed increases to an angle such that, at Nmax, the air expands to 50% of the admission pressure during the end of the intake stroke.

In an advantageous manner, it is possible to operate the variable timing device so that the exhaust opening is advanced during phases of acceleration of the vehicle and during stabilised regimes where there is insufficient excess air.

5. In order to increase the efficiency of the engine brake of a 4-stroke engine, the phase shifters are programmed to advance the exhaust opening in order to reduce the positive work on the engine shaft and accelerate the turbocharger, and to advance the exhaust cut-off in order to increase the negative work during the exhaust stroke. In order to avoid recovering that energy during the intake stroke, the admission opening is maintained close to the top dead centre in order to throttle the recompressed gases towards the intake manifold with degradation of the total pressure and substantial conservation of the total temperature. Those gases are then drawn into the cylinder again in order to participate in the following cycle. The exhaust must not be cut off too soon, so that the volume of those gases remains lower than the cubic capacity of the engine, and so that a flow of air passes through the cylinder in the admission-exhaust direction in order to evacuate the heat produced by braking of the vehicle.

6. In order to facilitate cold starting of a 4-stroke diesel engine, the phase shifters are programmed as in 5, the exhaust cut-off being advanced even further in order to reverse the flow of air through the engine so as to accumulate, upstream of the engine, an air load which reaches auto-ignition temperature stepwise, over several cycles. Immediately after ignition, the exhaust cut-off will be retarded in order to start a flow of gas through the engine.

7. In order to increase the rotary movement of the air admitted into the cylinder through a tangential or helicoidal pipe, the phase shifters are programmed to retard the admission opening in order to increase the drop in pressure and accordingly the speed of flow at the seat of the valve.

Other advantages and features of the invention will become apparent upon reading the following description, which is given by way of non-limiting example and refers to the attached drawing, in which.

Figure 7A:
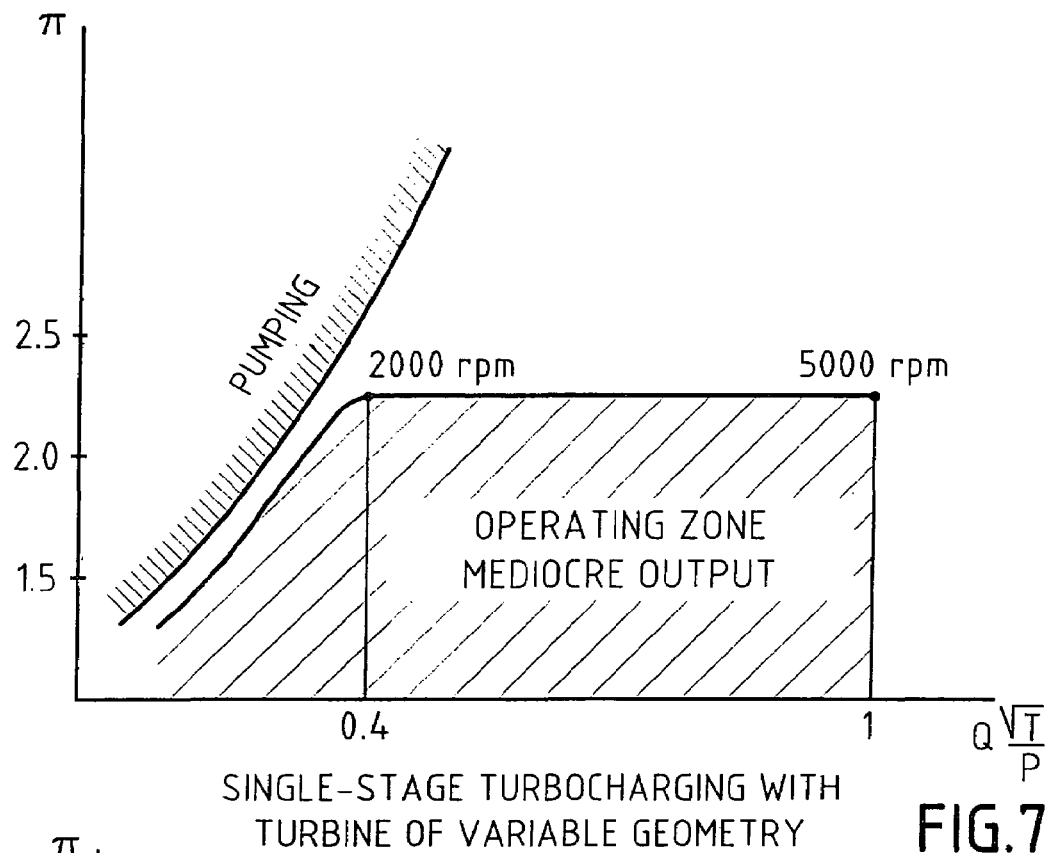
Figure 7B:
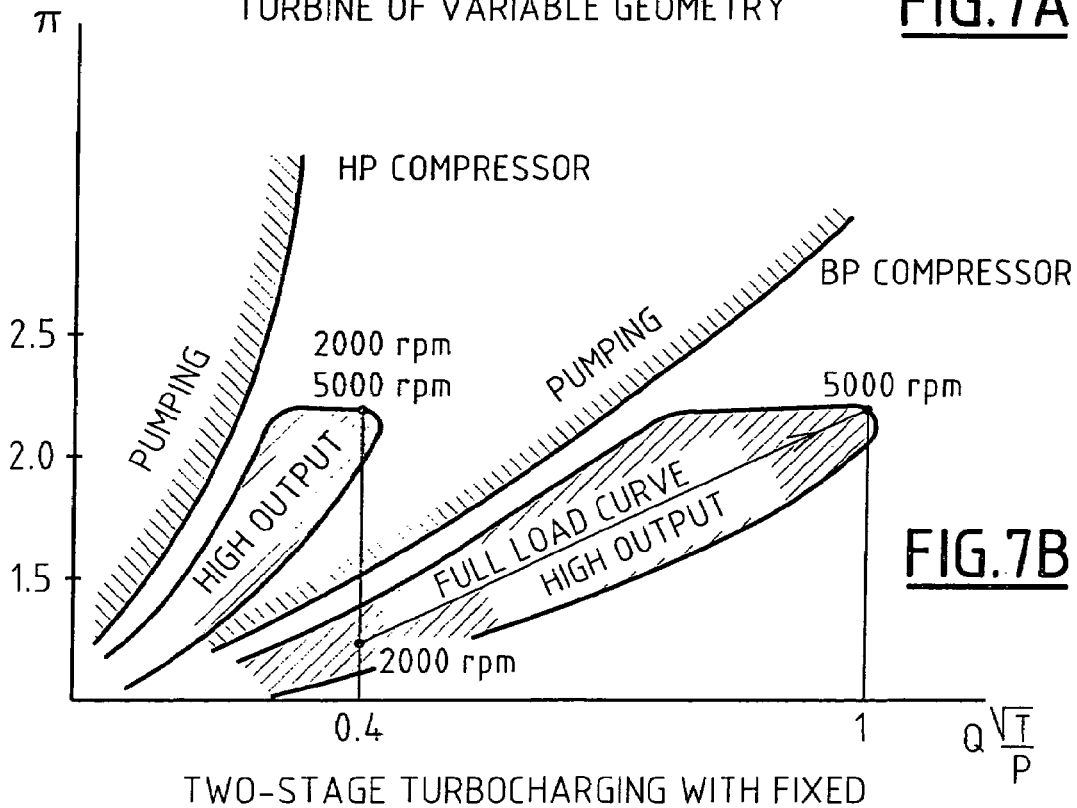
Figure 9:
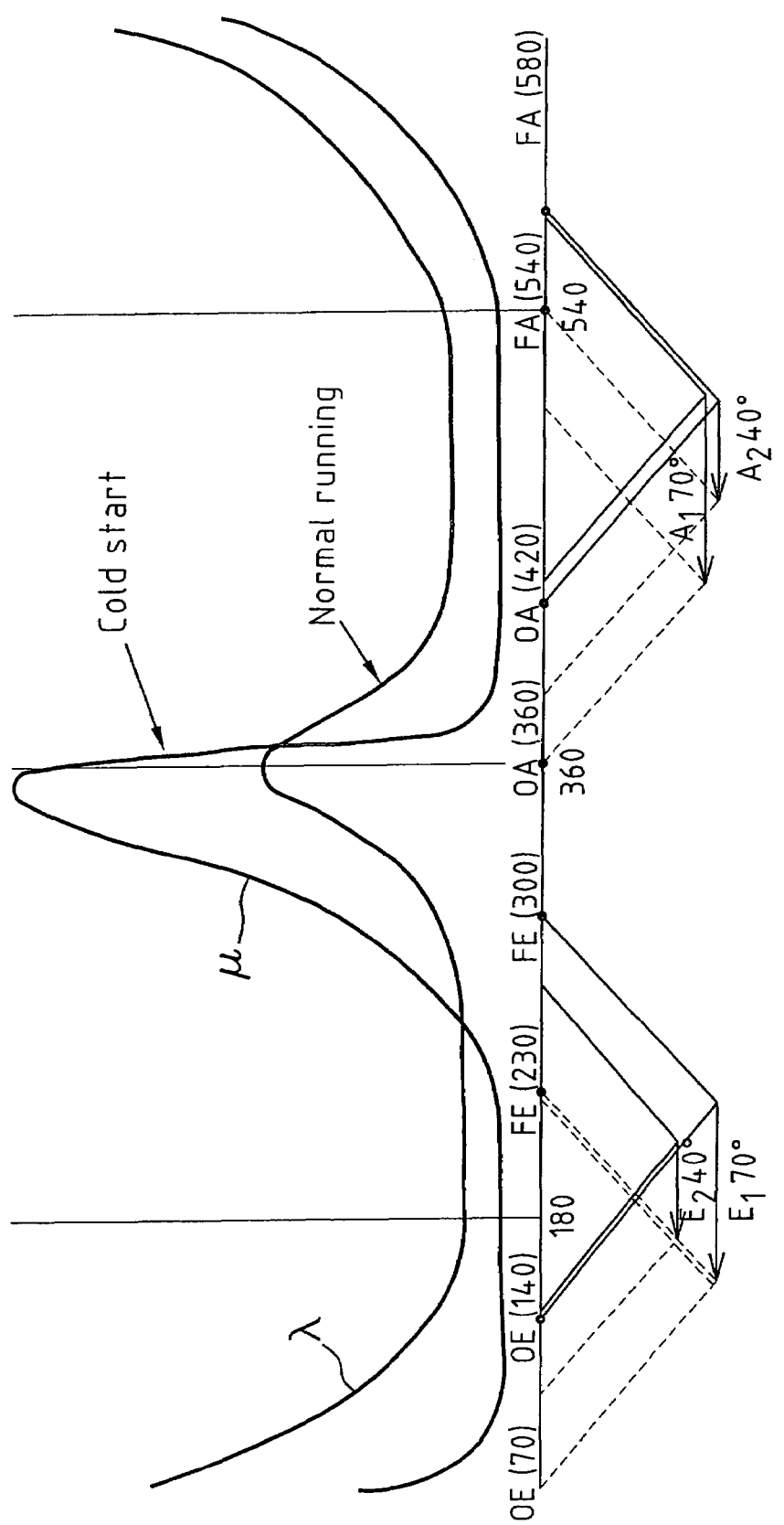
Figure 10:
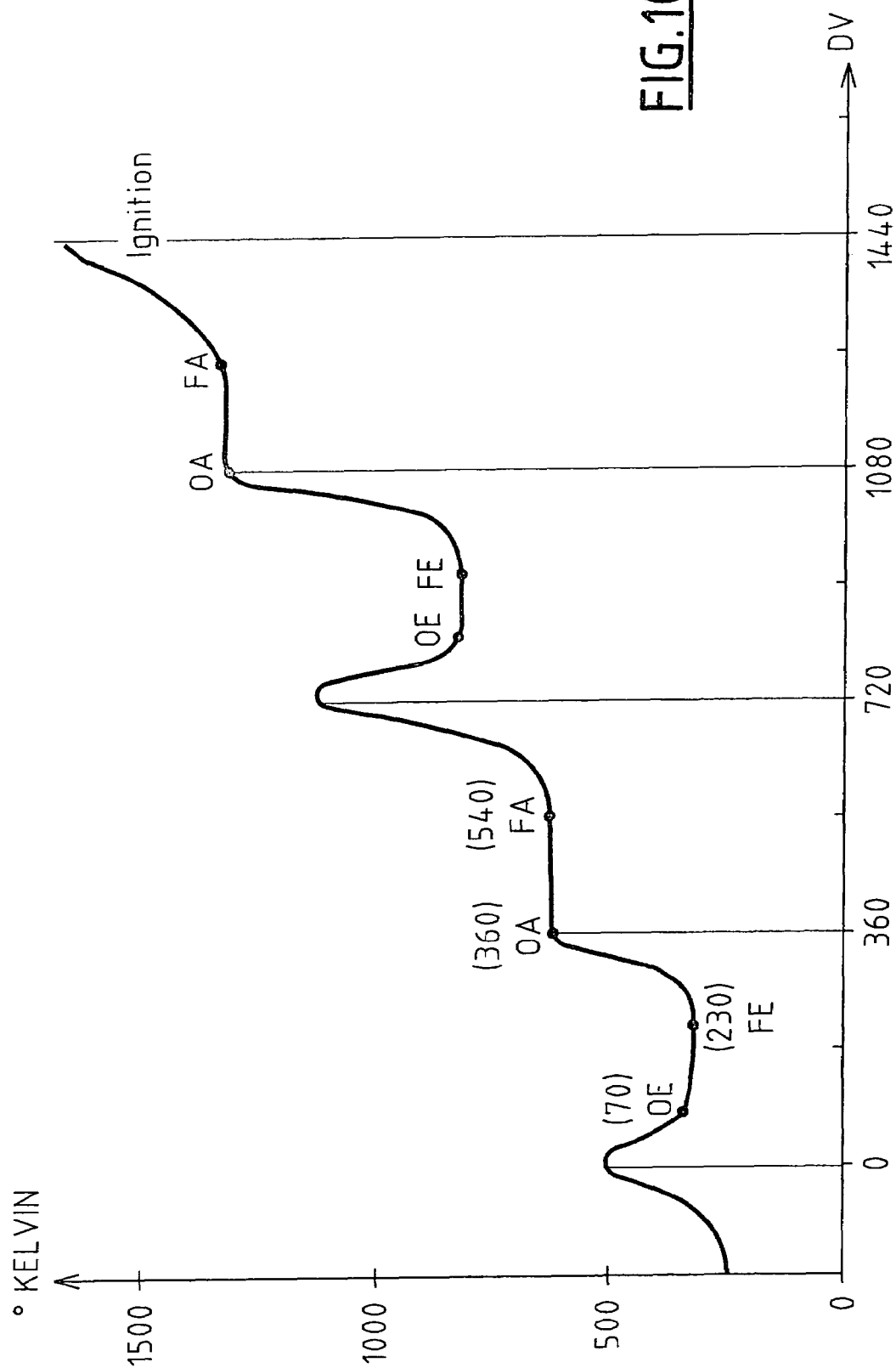

FIGS. 7($a$ and $b$) and 8 show operating diagrams for application no. 4 for adapting the turbochargers of a 4-stroke engine;

FIG. 9 shows operating diagrams for application no. 5 for improving the engine brake of a turbocharged 4-stroke engine;

FIG. 10 shows operating diagrams for application no. 6 for improving the cold starting of a 4-stroke diesel engine.

Figure 1:
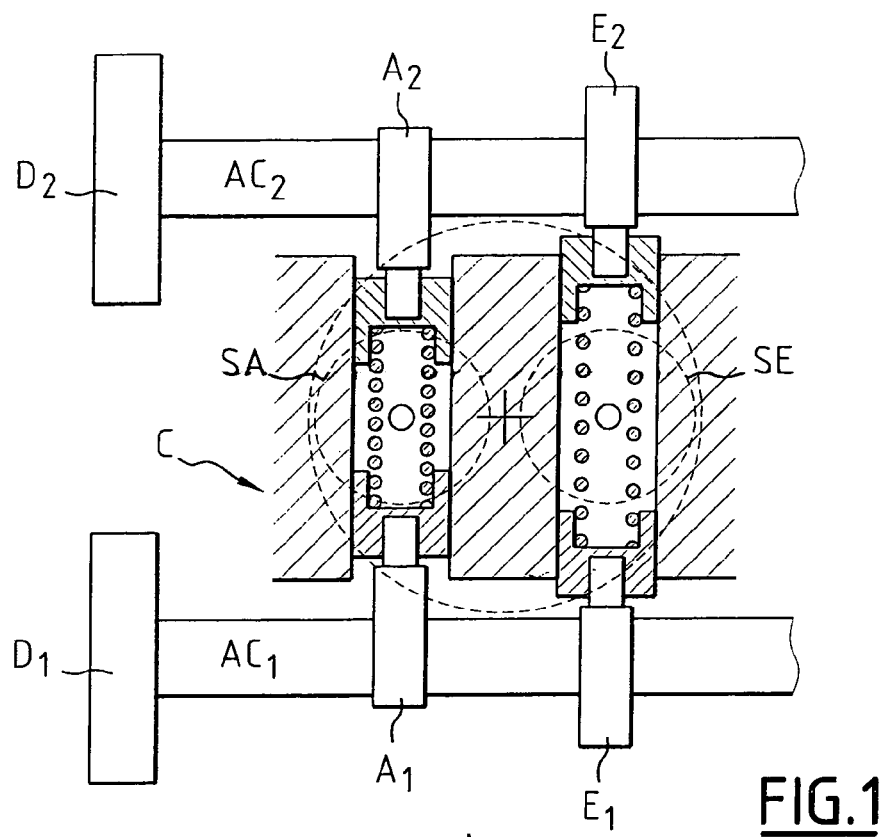
FIG. 1 shows a diagrammatic view in horizontal section through the axes of the camshafts of a device according to the invention in a first embodiment.

Referring to FIG. 1, the Figure shows diagrammatically a top view of a cylinder head C of a cylinder of a four-stroke reciprocating engine equipped with two valves, namely an admission valve SA and an exhaust valve SE. The admission and exhaust circuits have not been shown. The valves are actuated by two overhead camshafts AC1 and AC2, each of which is provided with a respective angular phase shifter D1 and D2. The angular phase shifters may be any type of phase shifter already available commercially. During operation of the engine, they allow each camshaft to be offset angularly relative to the engine shaft, as a function of operating parameters of the engine. Because they are well known to the person skilled in the art, they will not be described in greater detail. If need be, reference may be made to EP Patent 0 388 244 or U.S. Pat. No. 5,645,017.

Figure 2:
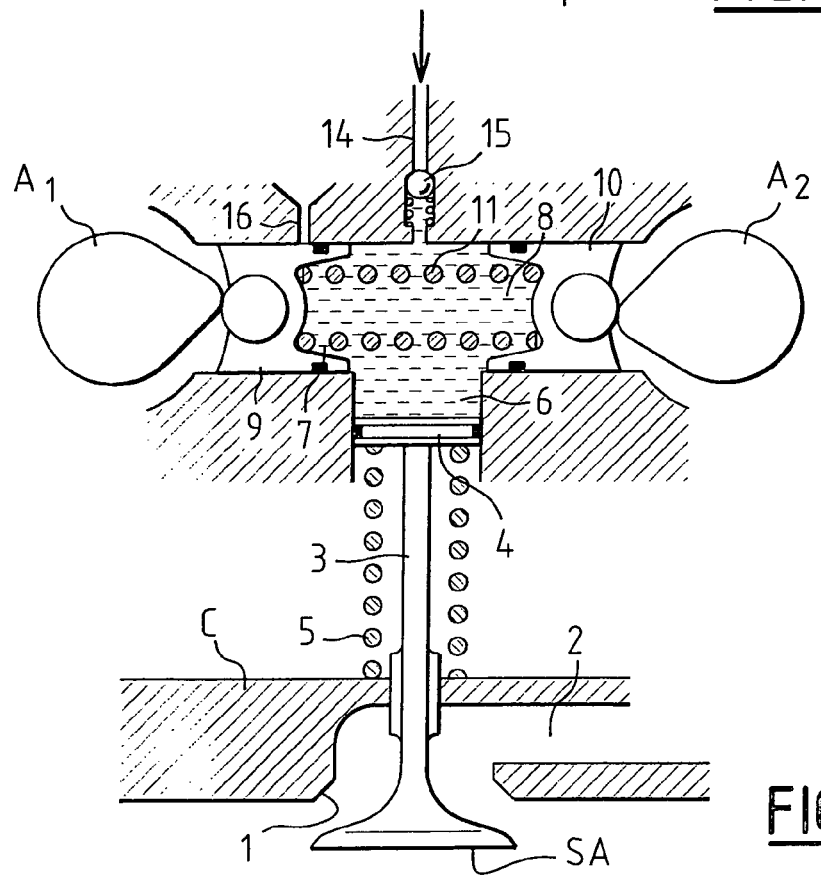
FIG. 2 shows a diagrammatic view in vertical section through the axis of the valves of that device in that first embodiment.

Referring to FIG. 2, the Figure shows a diagrammatic view in transverse section through the axis of the admission valve SA. The valve SA is capable of moving away from and moving towards its seat 1, which forms the outlet of the intake manifold 2. The valve spindle 3 terminates in a piston 4 which is returned to the valve closure position by a spring or other resilient return member 5. The valve piston 4 slides in a chamber 6 into which two other chambers 7, 8 open. Tight pushers or pistons 9, 10 slide in the chambers 7 and 8, there being interposed between the pushers or pistons 9, 10 a spring 11 which ensures that they are in contact with the cams. The pushers 9, 10 are in operative contact with the camshafts AC1 and AC2, which carry admission valve cams A1 and A2. The cavity delimited by the chambers 6, 7 and 8 and their communication conduits is filled with a volume of oil equal to the volume of the cavity when the valve is resting on its seat and the pushers are resting on the pitch circle of their cams. It is possible for that volume of oil to be maintained by the provision of a feed pipe 14 connected to the engine oil pressure by a non-return valve 15. The force of the spring 5 is sufficient to prevent the valve from opening simply under the action of the arrival of the oil under pressure through the pipe 14 when the valve 15 opens. A minimum pressure is thus guaranteed in the cavity when the valve is on its seat. A vent 16 is advantageously provided in the vicinity of the rest position of the pusher 9 in order both to purge the circuit of any gas and to evacuate any overflow. In that manner, the volume of oil is recalibrated at each cycle. Escape through the vent 16 is sealed off by the pusher 9 as soon as it begins to move to increase the pressure. In that manner, the operating play of the valves is also taken up automatically.

It is therefore ensured that the volume of liquid in the cavity is constant during the rest phase of the cams and the valve.

The exhaust valve SE is actuated by the cams E1 and E2 by means of a similar device.

It operates as follows:

Starting from the rest period, in which the valve is on its seat and the pushers are immobile and resting on the pitch circle of their cams, during which phase the pressure in the cavity becomes established substantially to the engine lubrication pressure, as soon as the first cam Al displaces the pusher 9, the latter closes off the vent 16 and delivers oil to the chamber 6 while pushing back the piston 4, which opens the valve. As long as the cam A2 has not become active, the displacement of the valve is proportional to that of the pusher 9 in the surface-area ratio of the pistons 9 and 4. As soon as the cam A2 becomes active, the flow delivered by the piston 10 is added to that of the piston 9 and the following may be written:

$$X_9 \cdot S_9 + X_{10} \cdot S_{10} = X_4 \cdot S_4$$

where X is the displacement of the pistons counted positively in the opening direction and negatively in the closing direction, S being their active surface area.

The oil pressure in the cavity therefore varies cyclically as a function of the force of the springs and of the inertia of the moving elements. These variations in pressure generate in the cavity a pulsating regime, the amplitude of which increases with the speed of the engine. It is imperative that the pressure in the cavity should always be sufficient to ensure contact between the cams and the pushers. The operation of the valves is improved by limiting the maximum pressure and the volume of the working fluid. This leads to a preference for large pusher cross-sections and short pipe lengths. The resilient return means may be metal or pneumatic or other springs. Each pusher may be returned individually, or only the valve pusher may be returned, the supply pressure then performing that function during the rest phases for the cam pushers 9, 10.

If one of the camshafts is phase-shifted relative to the other, for example by retarding the shaft AC2 relative to AC1, opening of the valve will be determined by AC1, but closing will be determined by AC2, because the pusher piston 10 will still be moved by the cam A2 whereas the pusher piston 9 will have returned to its rest position. It will therefore be understood that variations are thus obtained, not only in the angular positions of opening and closing of the valves by modifying the phases of the shafts, but also in the angular duration of the admission phase during which the valve SA is open.

Of course, it is possible to give the cams A1 and A2 different cam profiles in order to obtain any kind of configuration of the degrees of opening and closing of the valves, as well as angular durations of valve lift, or alternatively instantaneous lift values, that is to say the distance separating the valve SA from its seat 1.

For example, it is possible to provide one of the two cams with a cam ramp that has a steeper gradient than the other, for opening or closing, and, by acting on the phase shift, it will be possible to bring about either gradual or rapid opening or closing.

By way of example, the following possibilities, among others, are available for a motor having two camshafts each carrying two cams by cylinder:

OA, OE, FA, FE denote the angles (relative to the crankshaft) of opening (OA) and of closing (FA) of the admission phases and the angles of opening (OE) and of closing (FE) of the exhaust phases. A1 and A2 denote the cams acting on the admission and E1 and E2 denote the cams acting on the exhaust.

Table 1 below shows two possible timing sequences according to the invention in a cycle.

TABLE 1

| Possibilities | Controlled by AC2 | | Controlled by AC1 | |
|---|---|---|---|---|
| 1 | OA | OE | FA | FE |
| 2 | OE | FE | OA | FA |

Figure 4:
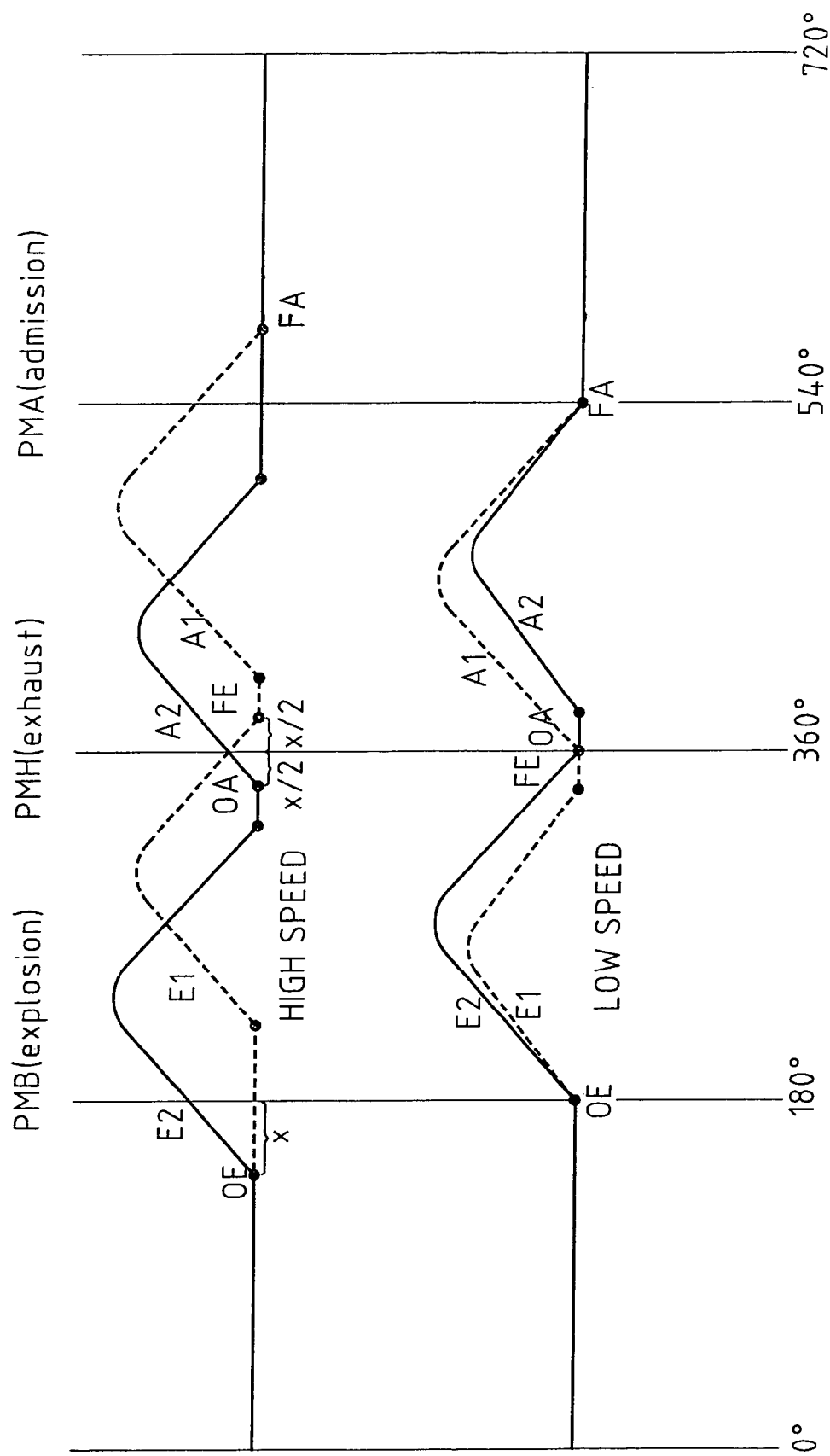
FIG. 4 shows operating diagrams at low speed, and at high speed, of application no. 1 according to the invention for optimising the respiration of a 4-stroke engine.

Other possibilities can be created by differentiating the duration of opening of A1 and A2 and/or of E1 and E2. For example, FIG. 4 shows that, over a first phase shift range, AC1 controls OE and FE, then over a second range AC1 can lose control of OE in favour of AC2, while retaining control of FE.

In the following description, the angles will be expressed in crankshaft degrees (DV), that is to say will correspond to a rotation of the crankshaft. In cases where the indicated angle measures the effective rotation of the camshaft (which turns twice as slowly in a four-stroke engine), the angle will be expressed in camshaft degrees (DC).

The method according to the invention can also be applied to engines having a pair of admission valves and/or a pair of exhaust valves, one of the valves of a pair being actuated by a first camshaft AC1 and the other by a second camshaft AC2, either individually, by a system of rocker arms, or simultaneously, the cams acting on the valves by the hydraulic operating means according to the invention.

Figure 3:
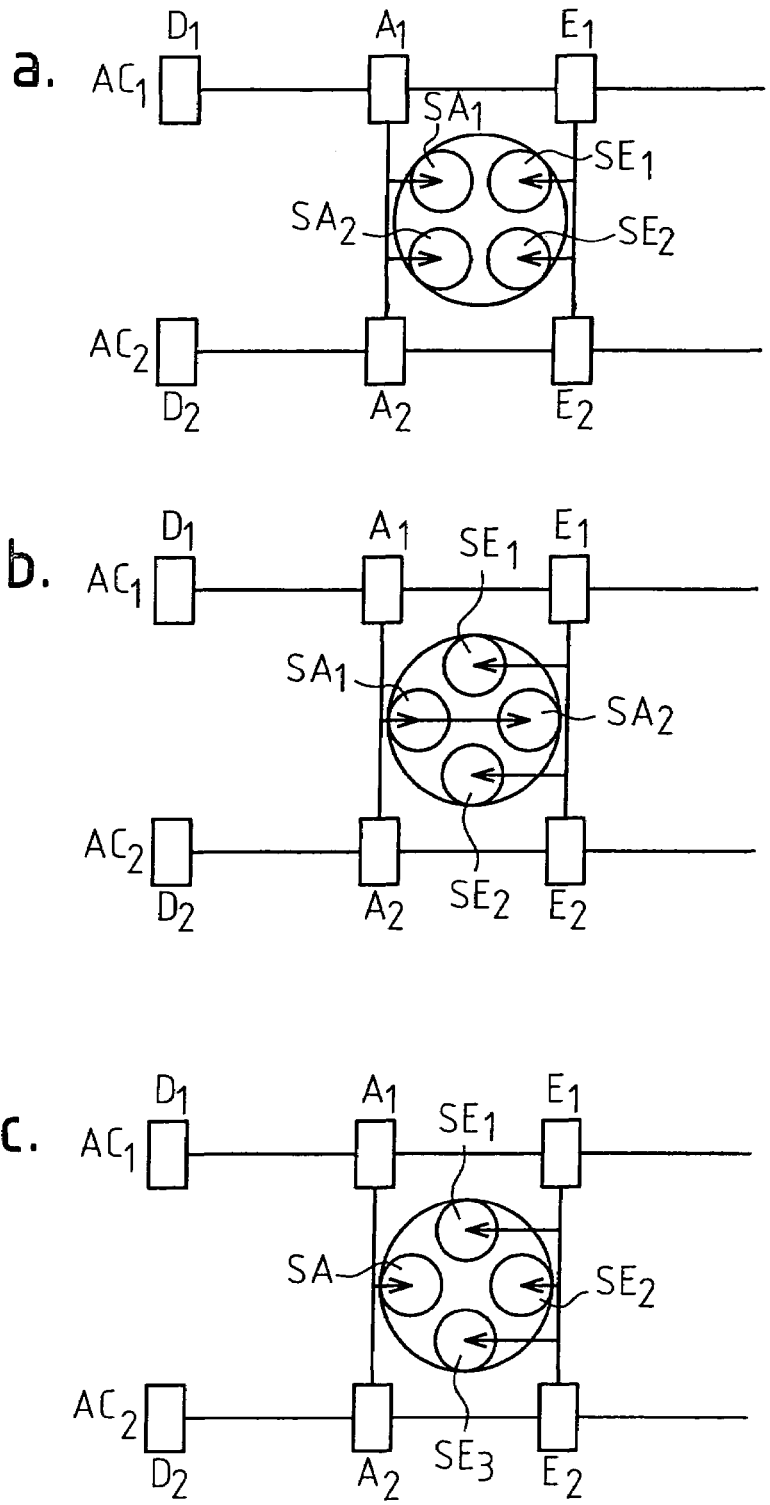
FIG. 3 shows diagrams of the application of the invention to three different designs of cylinder head having four valves, the arrows showing the functional connections between the cams and the valves.

For the sake of simplicity of the description, examples of the application of the method will now be given with reference to diagram a of FIG. 3.

Description of application 1 of the method: in the embodiment shown in FIG. 4, the admission valves SA1 and SA2 have the same dimensions. The same is true of the exhaust valves SE1 and SE2. The valves are operated by rocker arms or by hydraulic control as shown in FIG. 3, diagram a.

The camshaft AC1 actuates the valves SA1 and SE1, while the shaft AC2 actuates the valves SA2 and SE2.

FIG. 4 shows a diagram in which there is shown on the one hand a timing cycle at high speed and on the other hand a timing cycle at low speed, the X-axis showing the angle DV of the crankshaft with the exhaust top dead centre PMH at 360 DV, the Y-axis showing the cam lift. The admission cam A1 has a duration of lift of 90 DC, the admission cam A2 having a duration of lift of 80 DC only. The cam E1 has, for example, in the case shown, a duration of lift of only 80 DC, while the exhaust cam E2 has a duration of lift of 90 DC. When the engine is at low speed (bottom diagram), the phase shifters are regulated so that the exhaust phase opens at the exhaust bottom dead centre PMB, that is to say at 180 DV, and is cut off at the top dead centre PMH, that is to say at 360 DV. At the exhaust PMH, admission opening OA takes place, cut off FA occurring at the bottom dead centre at 540 DV.

Such an operation corresponds fully to operation at low speed.

It is well known that the acceleration of such a four-stroke engine must be accompanied by an angular advance of the admission opening and of the exhaust opening, as well as an angular retardation of the admission cut-off and of the exhaust cut-off. For example, an exhaust opening advance X of 40 DV and an admission opening advance X/2 of 20 DV may be desired. The phase shifters D1 and D2 are then actuated by the detection of the speed (top diagram) and the exhaust opening OE will take place 40 DV before the exhaust PMB by virtue of the angular advance conferred upon the exhaust cam E2 by the forward offset X/2=20 DC of the camshaft AC2, which rotates at half the speed of the engine. The admission cam A2, which is actuated by that same shaft AC2, will therefore act 40 DV sooner than in the case of low speed, and consequently 20 DV before the exhaust PMH, thus determining an admission opening advance X/2=20 DV. On the other hand, the camshaft AC1 is phase-shifted by 20 DC to the rear, the exhaust cam E1 then acting after the start of the exhaust phase OE. Its return to rest will, on the other hand, determine the end of the exhaust phase FE, which therefore occurs 20 DV after the exhaust PMH, that is to say 40 DV after the admission opening OA. As a result, there will simultaneously have been obtained an advance of the exhaust opening and a total lengthening of the exhaust duration, which finishes 20 DV after the PMH, which will greatly facilitate exhaust and will allow scavenging. Likewise, the admission opening OA will have been advanced by 20 DV, but the end of the final admission phase FA will be retarded by 40 DV after the admission bottom dead centre at 540 DV.

The intermediate speeds will correspond to intermediate phase shifts.

Figure 5:
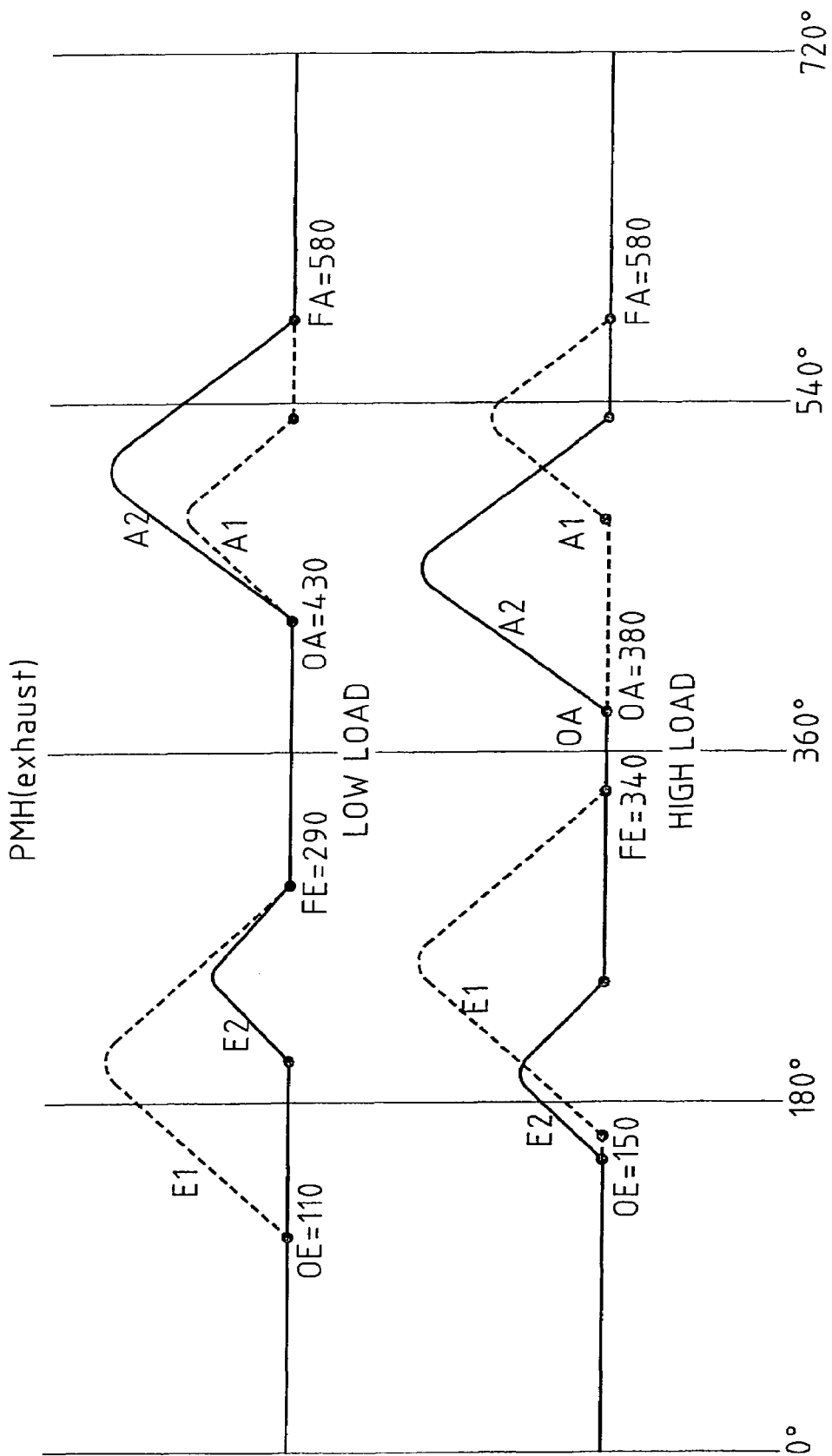
FIG. 5 shows operating diagrams at low load and at high load for application no. 2 according to the invention, used for recirculating the combustion gases from the preceding cycle.

Reference will now be made to FIG. 5, which relates to application no. 2, the X-axis and the Y-axis being the same as in FIG. 4.

This figure relates more directly to the case of 4-stroke diesel engines in which it is desired to retain in the cylinder an adjustable quantity of burnt gases from the preceding cycle, for example according to European Patent No. 0 593 152. To that end, it is expedient to cut off the exhaust phase prematurely and to retard opening of the admission phase correlatively, the retained gases undergoing a compression-expansion cycle in order to pass the exhaust PMH. More precisely, it is advantageous in this type of engine to recycle a large amount of burnt gases at low load and a small amount at high load. In addition, taking up of load must be accompanied by rapid acceleration of the turbocharger, furthered by an advance of the exhaust opening. The bottom diagram of FIG. 5 shows the timing at high load, and the top diagram shows the timing at low load.

In the intermediate cases, the setting will be intermediate between the two extremes shown.

The volume of hot gas retained in the cylinder is fixed by the position of the piston at FE (end of the exhaust phase). The pressure of the retained gas increases slightly during closure of the valve with the engine speed, owing to the increasing loss of load at FE. In order to avoid gas being taken into the admission pipe, it will be expedient to open the admission phase when the pressure in the cylinder is close to the pressure in the admission pipe.

In the present example, the maximum recycling corresponds to FE at 70 DV before the exhaust PMH, and the minimum for 20 DV. At low speed, and assuming that the pressure is identical in the admission and exhaust pipes, OA will be placed symmetrically relative to the exhaust PMH, namely 70 DV and 20 DV after. As the speed increases, it will be expedient to retard FE and advance OA.

For operation at low load, an OE advance of 70 DV has been chosen in order to bring about good acceleration of the turbocharger, and an FA retardation of 40 DV, which will increase with the engine speed.

For operation at high load, an OE advance of 30 DV and an unmodified FA retardation of 40 DV have been chosen.

These timing diagrams are provided by camshafts AC1 and AC2 which are configured in accordance with FIG. 4, that is to say with the following cam angular opening durations: A1=50 DC, A2=75 DC, E1=90 DC, E2=45 DC. The shaft AC1 carries the cams A1 and E1 with an angular spacing of 70 DC.

The shaft AC2 carries the cams A2 and E2 with an identical angular spacing.

Passage from maximum recycling to minimum recycling is effected by phase-shifting shaft AC1 by 25 DC in retardation and shaft AC2 by 25 DC in advance, that is to say 50° in crankshaft angles. The intermediate phase shifts will be programmed to take into account the needs of the engine.

Figure 6:
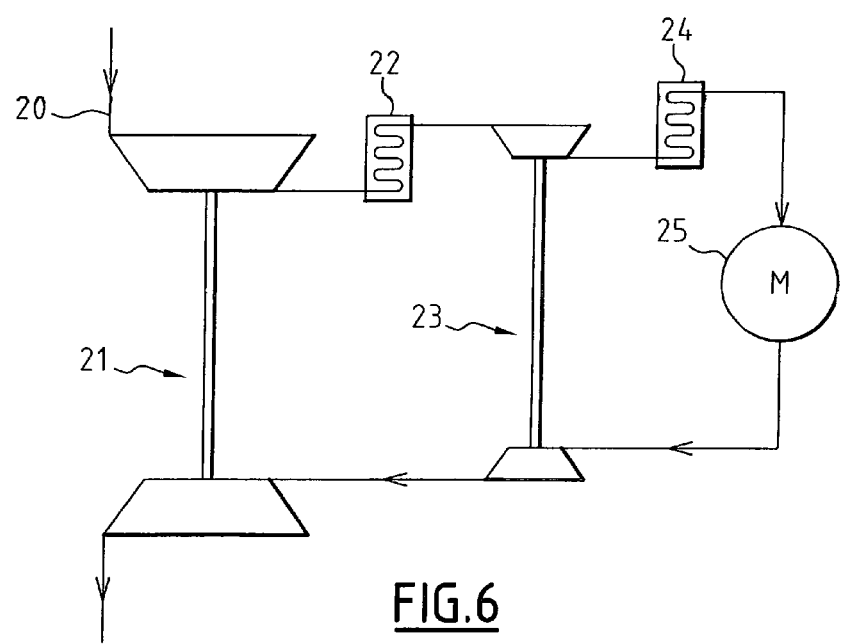
FIG. 6 shows diagrammatically a two-stage turbocharging device for a 4-stroke engine according to application no. 4.
Figure 8:
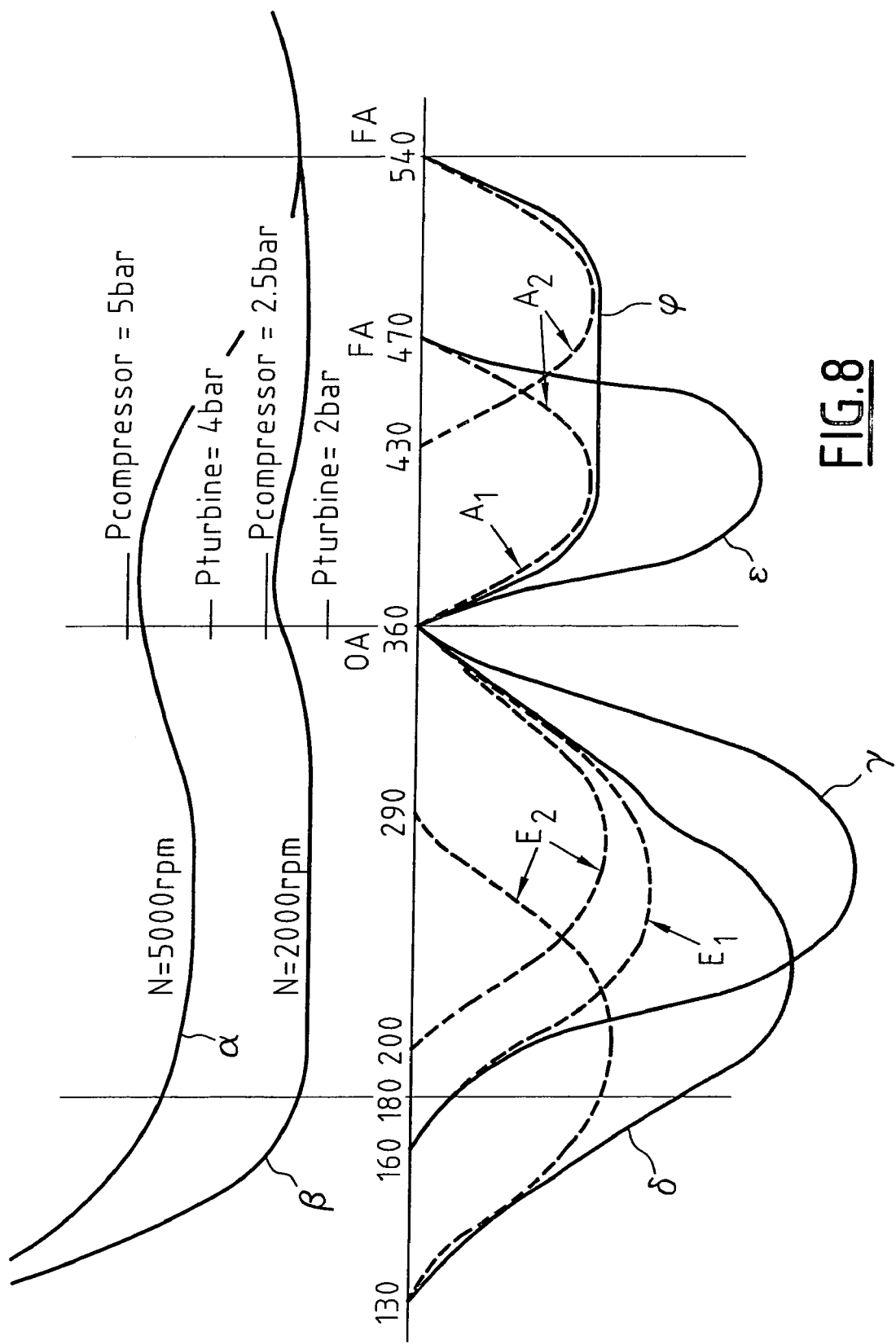

Reference will now be made to FIGS. 6, 7 and 8, which relate to application of the method no. 4:

FIG. 6 shows the air inlet 20 which terminates at the compressor stage of the large low-pressure (BP) turbocharger 21, the downstream end of which is connected, by way of a cooling device 22, to the compressor stage of the small high-pressure (HP) turbocharger 23, with a high-pressure cooling device 24 downstream, opening at the intake of the engine 25, the exhaust of which is connected in series to the HP and then BP turbine stages of the turbochargers.

The use of the method according to the invention for achieving large variations in the angular duration of the admission and/or exhaust phases assumes that the angular opening of the cams is much lower than the conventional values, with a large reduction in the delivery capacity of the orifices of the cylinder head. The air pressure necessary to maintain good filling of the cylinder at high speed is considerably increased as a result. It is therefore expedient to use a turbocharging method which is capable of a high pressure ratio associated with a high energy yield in order not to degrade the output of the engine.

Moreover, a supercharged 4-stroke motor vehicle engine, a diesel engine for example, must supply its maximum torque above 30 to 40% of its maximum speed of rotation. The turbocharger actuated by the flow of exhaust gases must therefore provide the nominal air load at low speeds and maintain it to the maximum speed.

The best solution used nowadays for achieving that aim is a compressor capable of large variations in flow at constant feed pressure, associated with a turbine of geometry variable as a function of the engine speed. That flexibility of the turbo machine in terms of flow is at the expense of a considerable loss of isentropic global output, compensated by a rise in turbine pressure in order to drive the compressor, and therefore by a loss of thermal yield of the engine which is a great penalty for the high admission pressures associated with the variable timing methods according to the present invention.

The general principle of the present turbocharging method is to supply the intake manifold with a substantially constant volume of air at variable pressure, instead of with a variable volume of air at constant pressure. That cooled volume of air is chosen to be equal to the volume scavenged by the pistons at the maximum torque speed, that is to say, for example, 40% of the maximum speed. At that small volume, the air load necessary for full power must be brought to a pressure which is at least twice as high as in a conventional engine, namely close to 5 bar. This requires the use of two-stage turbocharging, preferably with fixed geometry and high output with cooling after each compressor, in accordance with the prior art as shown in FIG. 6, which shows the arrangement of the two BP and HP compressors and of the two BP and HP air coolers, relative to the engine.

The present method is distinguished by the low aerodynamic permeability of the admission device, chosen to create, at the intake bottom dead centre, a drop in air pressure which is as great as the speed (speed of rotation) at the maximum torque is desired to be low, namely a drop of about 50% at the maximum speed Nmax of the engine, in the example shown.

With fixed timing which cuts off admission in the vicinity of the intake bottom dead centre, the drop in pressure is due to the acceleration of the flow at the orifices. At 0.4 Nmax, it will be about 8%. On the full-load curve, the pressure delivered by the turbochargers, being substantially proportional to the flow of burnt fuel, will pass from 2.5 bar at 0.4 Nmax to 5 bar at Nmax; it will therefore be understood that the pressure in the cylinder will be relatively independent of the speed: it will pass, for example, taking into account the loss of pressure at the undersized admission orifices, from 2.5–8%=2.3 bar at 2000 rpm to 5–50%=2.5 bar at 5000 rpm. This method therefore permits natural adaptation of turbochargers of fixed geometry to an engine of variable speed and fixed timing, without any adjustment such as control of a variable geometry or a flow of gas bypassing a turbine.

Variable timing according to the invention allows the consumption of a supercharged engine at high speed to be improved by that method by replacing the static pressure drop of the air throughout the intake stroke by a lesser acceleration of the air through an admission orifice of larger cross-section during an intake stroke cut short by premature closure of the admission valves, followed by expansion to the bottom dead centre.

The present invention permits operation of the turbocharging which is better suited to the propulsion of motor vehicles where the thermal yield must be optimised to the regime of maximum torque, to the detriment of maximum speed.

The advantages of this arrangement are many:
rapid acceleration of the small HP turbocharger 20, which receives its nominal volume of gas at low engine speeds and which opposes low inertia to acceleration,
good elementary isentropic yields of the turbines and compressors of fixed geometry, with the additional benefit of cooling of the air between the compressors,
simplicity and reliability of the fixed geometry, associated with reasonable centrifugal stresses thanks to multiplication of the pressure ratios,
operation of the compressors in zones of characteristic fields close to their pumping line, where the yields are high,
high speed of introduction of the air into the cylinder, causing considerable turbulence during combustion.

FIG. 7 shows the compared adaptations of a single stage with variable geometry and of two stages with fixed geometry according to the invention.

In that Figure:
π is the downstream pressure/upstream pressure ratio of the compressor,
Q is the mass flow of air,
P, T are the pressure and temperature upstream of the compressor.

Also shown are the pumping curves and the zones of operation at variation of speed.

It will be seen that, for a conventional system, the point of operation develops in the hatched region, where the yields are mediocre. In the invention, by contrast, the points of operation of the two compressors are confined to zones of high yield.

FIG. 8 shows two operating diagrams at 2000 and 5000 rpm at full load, for an engine having two camshafts AC1 and AC2, AC2 being equipped with a phase shifter D2, which camshafts carry respective admission cams A1 and A2 and an exhaust cam E1 and E2. The X-axis shows the angular position of the engine shaft in DV, the combustion top dead centre constituting the origin. The positive ordinate shows the static pressure in the cylinder, and the negative ordinate shows the lift of each cam and the admission and exhaust cross-sections resulting therefrom.

The curves shown are:
α, β: static pressures in the cylinder at 5000 rpm and 2000 rpm, respectively;
γ, δ: exhaust cross-sections at 5000 rpm and 2000 rpm, respectively;
ε, φ: admission cross-sections at 5000 rpm and 2000 rpm, respectively;
the curves in broken lines are the individual lifts of the cams A1, A2, E1, E2.

AC1, the setting of which is fixed, carries an exhaust cam E1 of 100 DC which opens at 160 DV and closes at 360 DV, and an admission cam of 55 DC which opens at 36.0 DV and closes at 470 DV.

AC2, the setting of which varies by 35 DC, that is to say 70 DV, carries an exhaust cam E2 of 80 DC and an admission cam A2 of 55 DC, spaced by 35 DC. At low speed, AC2 is set in a retarded position in order to close E2 at 360 DV and A2 at 540 DV, while at high speed AC2 is advanced by 35 DC, that is to say 7 DV. Between those two values, the setting of AC2 varies as a function of the speed and optionally of the load according to a law which optimises the positive work of the gases during the intake stroke.

It will thus be seen that, at a low piston speed, the pressure in the manifold is low and the engine aspirates all its cubic capacity without a marked drop in pressure, despite the reduced cross-section of the admission orifices. At high piston speed, the overpressure in the manifold is high and the engine takes in only half of its cubic capacity through admission orifices of large cross-section, with a similar drop in pressure. After FA (admission cut-off), the air load that has been admitted expands in the cylinder to the bottom dead centre.

FIG. 9 shows an operating diagram for a method of improving the braking function and cold starting of a 4-stroke engine with recycling of burnt gases, according to application no. 2 of the method.

The X-axis shows the angular position of the engine shaft in degrees DV, the origin being the combustion top dead centre, the positive Y-axis shows the pressure of the gases in the cylinder for the two extreme settings, normal operation (λ) and cold starting (μ), the negative Y-axis shows the position of the cams. The engine brake position will be intermediate between those two extreme settings.

In order to create braking of the engine starting from a normal timing setting, OE, FE and OA are simultaneously advanced while maintaining FA in the vicinity of 540 DV, until an angle at which the dissipation of energy reaches the maximum value.

The advance of OE diminishes the expansion work on the piston while increasing the power of the turbine, and the advance of FE increases the negative work of the piston during the exhaust stroke, work which is not recovered during the intake stroke thanks to the advance of OA. On admission opening at the top dead centre, the recompressed air is directed towards the intake manifold where it loses its total pressure while retaining its total temperature, to occupy a volume greater than that which it occupied at FE. That volume, which will immediately be taken into the cylinder again, must be smaller than the cubic capacity of the engine so that a volume of fresh air can be added thereto during the following intake stroke to constitute the load for the following cycle. The exhaust temperature and the flow of air stabilise at a level which depends only on the angle of FE, the braking power being proportional to the product of those two parameters.

Beyond a certain advance of FE, the flow of air through the engine is reversed to go from the exhaust manifold to the intake manifold, with pronounced heating through the engine. Hot air is thus accumulated upstream of the engine, which facilitates cold starting as soon as the normal direction of flow is re-established. FIG. 10 shows the approximate evolution of the temperatures during the two first, supposedly adiabatic cycles of an engine at a geometric rate of compression of 11/1 for a timing according to the diagram of FIG. 9. The X-axis shows the crankshaft angle DV, the Y-axis shows the temperature of the air in ° K.

The engine comprises two camshafts AC1, AC2 equipped with phase shifters D1, D2. AC1 carries an admission cam A1 of 75 DC and an exhaust cam E1 of 85° DC, spaced by 65 DC. AC2 carries an admission cam A2 of 80 DC and an exhaust cam E2 of 65 DC, spaced by 75 DC.

The normal timing setting is: OA=420 DV, FA=580 DV, OE=140 DV, FE=300 DV.

For cold starting, the setting is: OA=360 DV, FA=540 DV, OE=70 DV, FE=230 DV.

That setting is obtained by advancing AC1 by 35 DC and AC2 by 20 DC, that is to say 70 DV and 40 DV, respectively, by actuating D1 and D2.

The starter is actuated when the piston is at the admission bottom dead centre and the cylinder is full of cold air at 250° K. The first compression brings the temperature to 500° K. The shortened expansion which follows leaves in the cylinder air at 350° K, which will be re-compressed to 600° K and then taken into the cylinder again at that temperature in order to undergo further compression—shortened expansion leading to 800° C. The following partial compression brings the air to 1350° K and the final compression reaches 2700° K.

Of course, a cold cylinder constitutes a heat well which will absorb a large part of the energy of the successive compressions, but if it is considered that 800° K is largely sufficient for auto-ignition, it will be seen that in 4 strokes of the starter a diesel of low compression rate starts by very low ambient temperature. Immediately after ignition, the timing setting is returned to the normal position, where each cycle is ignited by the hot gases from the preceding cycle.

In this application, as in the preceding applications, the angular setting of the camshafts by the phase shifter(s) is controlled by the usual on-board computer, which takes into account the necessary parameters.

The invention claimed is:

1. Variable timing device for reciprocating engines having at least two camshafts (AC1, AC2), comprising, for one and the same cylinder, at least one admission valve (A) and at least one exhaust valve (E), which valves are actuated by said shafts, as well as angular phase shift means (D1, D2) for at least one of said camshafts, characterized in that at least one and the same valve (A) is actuated by a hydraulic transmission means (4, 9, 10) which is capable of transmitting to said valve the movement of at least two cams (A1, A2) belonging to separate camshafts (AC1, AC2) which can be phase-shifted relative to one another, said transmission means comprising a cavity delimited by at least two deformable or movable surfaces (9, 10) which are capable of being displaced by the cams (A1, A2), as well as at least one deformable or movable valve surface (4), said surfaces being returned by resilient return means, being filled with a constant volume of hydraulic fluid equal to the volume of the cavity when the cams and the valve are at rest, so that, by virtue of the incompressibility of the hydraulic liquid, any displacement caused by a cam leads to displacement of the valve, and that any phase shift between the camshafts modifies the degree of displacement of the valve as a function of the angular position of the crankshaft.

2. Device according to claim 1, characterised in that said movable or deformable surfaces are pistons sliding in cylinders (4, 9, 10).

3. Device according to claim 1, characterised in that the hydraulic cavity is connected to an oil pressure source by means of a non-return valve (15) in order to compensate for leaks.

4. Device according to claim 1, characterised in that it comprises a discharge orifice for hydraulic fluid which is open during the rest phases and closed during the active phases of the cams in order to evacuate any overflow.

5. Device according to claim 4, characterised in that a small discharge orifice (6) is uncovered by one of the surfaces or pushers when it is at its dead centre and is covered again as soon as the piston or pusher moves, in order to drain off the overflow, providing automatic elimination of the operating play of the surfaces.

6. Two stroke cycle or four stroke cycle engines in which at least one engine cylinder valve is actuated by a device according to claim 1.

7. Engine according to claim 6, in which the engine cylinders have only one admission valve and/or one exhaust valve.

8. Engine according to claim 6, in which the cylinders comprise a plurality of admission valves, which are preferably identical, or a plurality of exhaust valves, which are preferably identical, the valves of a plurality being actuated by the same device.

9. Variable timing method for the engines, including the engines according to claim 6, in which, for one and the same cylinder, at least under certain operating conditions, the start of the admission and/or exhaust phases is controlled by a cam that belongs to one of the camshafts and the end of said phases is controlled by a cam that belongs to another camshaft, by modifying, during operation, the phase shift between said camshafts, and hence the angular duration of the phase in question, by phase shift means which are sensitive to one or more operating parameters of the engine, the parameters acting on the phase shift means to produce an angular phase shift preferably being loaded or the engine torque or the speed, the rate of recycling of burnt gases or the operating conditions of turbochargers, the characteristics of the engine brake and the cold start capacities.

10. Method according to claim 9, characterised in that, in order to optimize the respiration of a 4-stroke engine, the phase shifters are programmed to increase the admission opening advance, the exhaust cut-off retardation, the exhaust opening advance and the admission cut-off retardation when the speed increases.

11. Method according to claim 9, characterised in that, in order to create a retention of hot gases in a 4-stroke engine, especially a diesel engine, the phase shifters are programmed to advance the exhaust cut-off and, correlatively, to retard the admission opening without substantially modifying the exhaust opening and the admission cut-off.

12. Method according to claim 9, characterised in that, in order to accelerate a turbocharger of an engine, the phase shifters are programmed to increase the exhaust opening advance without substantially modifying the exhaust cut-off, and the admission cut-off/opening.

13. Method according to claim 9, characterised in that, in order to increase the efficiency of the engine brake of a 4-stroke engine, the phase shifters are programmed to advance the exhaust opening in order to reduce the positive work on the engine shaft and accelerate the turbocharger, and to advance the exhaust cut-off in order to increase the negative work during the exhaust stroke and, in order to avoid recovering that energy during the intake stroke, the admission opening is simultaneously advanced in order to draw the recompressed gases towards the intake manifold with degradation of the total pressure and conservation of the total temperature, said gases then being drawn into the cylinder again in order to participate in the following cycle, the exhaust being cut off sufficiently late that the volume of those gases remains lower than the cubic capacity of the engine, so that a flow of air passes through the cylinder in the admission-exhaust direction in order to evacuate the heat produced by braking of the vehicle.

14. Method according to claim 9, characterised in that, in order to facilitate cold starting of a 4-stroke diesel engine, the phase shifters are programmed to retard the admission opening in order to increase the drop in pressure and accordingly the speed of flow at the seat of the valve, but the exhaust cut-off is advanced even further in order to reverse the flow of air through the engine so as to accumulate, upstream of the engine, an air load which reaches auto-ignition temperature stepwise, over several cycles, the exhaust cut-off being retarded immediately after ignition in order to start a flow of gas through the engine.

15. Method according to claim 9, characterised in that, in order to increase the rotary movement of the air admitted into the cylinder through a tangential or helicoidal pipe, the phase shifters are programmed to retard the admission opening in order to increase the drop in pressure and accordingly the speed of flow at the seat of the valve.

* * * * *